United States Patent

Bertin et al.

[11] Patent Number: 6,011,804
[45] Date of Patent: Jan. 4, 2000

[54] DYNAMIC BANDWIDTH RESERVATION FOR CONTROL TRAFFIC IN HIGH SPEED PACKET SWITCHING NETWORKS

[75] Inventors: Olivier Bertin, Nice; Claude Galand, Cagnes sur Mer; Olivier Maurel, Le Cannel, all of France

[73] Assignee: International Business Machines Corporation, Armonk, N.Y.

[21] Appl. No.: 08/771,333

[22] Filed: Dec. 16, 1996

[30] Foreign Application Priority Data

Dec. 20, 1995 [EP] European Pat. Off. .............. 95480178

[51] Int. Cl.⁷ .............................. H04J 3/16; H04L 12/28; G01R 31/08
[52] U.S. Cl. .......................... 370/468; 370/468; 370/400; 370/230; 370/236
[58] Field of Search .................................... 370/254, 255, 370/256, 230, 237, 400, 468, 351, 238, 396, 412, 410, 522, 252, 253, 236; 395/11, 200

[56] References Cited

U.S. PATENT DOCUMENTS

| | | | |
|---|---|---|---|
| 4,763,321 | 8/1998 | Calvignac et al. | 370/400 |
| 5,367,517 | 11/1994 | Cidon et al. | 370/400 |
| 5,687,167 | 11/1997 | Berlin et al. | 370/254 |
| 5,687,292 | 11/1997 | Boda et al. | 395/11 |
| 5,734,825 | 3/1998 | Lauck et al. | 395/200 |
| 5,881,050 | 3/1999 | Chevalier et al. | 370/230 |

*Primary Examiner*—Michael Horabik
*Assistant Examiner*—Man Phan
*Attorney, Agent, or Firm*—Daniel E. McConnell

[57] ABSTRACT

A method and system for reserving dynamically and in priority for each link of the network the exact amount of bandwidth necessary for the transmission of the network control traffic. An evaluation of the expected control traffic on each link of the network is performed in order to allocate a sufficient but minimum fraction of the link bandwidth and for allocating the maximum available bandwidth for the user traffic.

3 Claims, 9 Drawing Sheets

HIGH SPEED PACKET SWITCHING NODE

TOPOLOGY DATABASE
Link Characteristics

| CHARACTERISTICS | | LINK VALUES | | | |
|---|---|---|---|---|---|
| NAME | DESCRIPTION | A | B | ... | N |
| C | Total capacity (bps) | $C_A$ | $C_B$ | ... | $C_N$ |
| rf | Reservable fraction (%) | $rf_A$ | $rf_B$ | ... | $rf_N$ |
| $\hat{C}_R$ | Total reserved bandwidth (bps) | $\hat{C}_{R,A}$ | $\hat{C}_{R,B}$ | ... | $\hat{C}_{R,N}$ |
| $M_{NR}$ | Total bandwidth used by NR traffic (bps) | $M_{NR,A}$ | $M_{NR,B}$ | ... | $M_{NR,N}$ |
| mps | Maximum packet size (bytes) | $mps_A$ | $mps_B$ | ... | $mps_N$ |

NETWORK CONNECTION
TABLE
Connection Characteristics

| CHARACTERISTICS | | CONNECTION VALUES | | | |
|---|---|---|---|---|---|
| NAME | DESCRIPTION | A | B | ... | N |
| c | Reserved capacity (bps) | $c_A$ | $c_B$ | ... | $c_N$ |
| ref | Bandwidth refresh performed (boolean) | YES | NO | ... | YES |
| ba | Bandwidth adaptation performed (boolean) | NO | NO | ... | YES |
| mps | Maximum packet size (bytes) | $mps_A$ | $mps_B$ | ... | $mps_N$ |

DYNAMIC BANDWIDTH RESERVATION FOR CONTROL TRAFFIC IN HIGH SPEED PACKET SWITCHING NETWORKS

TECHNICAL FIELD

The present invention relates to bandwidth reservation in high speed transmission networks and more particularly a method and system for dynamically allocating bandwidth to control traffic in connection oriented packet switching networks.

BACKGROUND ART

Technology and Market Trends

The evolution of telecommunications in general and of packet switching networks in particular is driven by many factors among which two of them worth emphasizing: technologies and applications.

Emerging Technologies

Communication technologies have realized these last years considerable progress with:

the maturing of new transmission media and specially of optical fiber. High speed rates can now be sustained with very low bit error rates. For example, the very important bandwidth provided by optical connections, their low attenuation and their high transmission quality are turned to account as well as for long distance networks as for high rate local networks.

the universal use of digital technologies within private and public telecommunications networks.

The emergence of high speed transmission entails an explosion in the high bandwidth connectivity. The advent of these new technologies has pushed the speed of communication links to the area of the giga-bit per second representing an increase of several orders of magnitude over typical links in traditional networks. The increase in communication capacity is generating more attractive tariffs and large bandwidths are economically more and more attractive.

New Applications

On the other hand, in relation with these new emerging technologies, many potential applications that were not possible before are now becoming accessible and attractive. In this environment, three generic requirements are expressed by the users:

Improving Old Applications

Sub-second response times, which are achievable on low cost personal computers, have raised user expectations so that the lengthy wide area networks response times that were acceptable some years ago are today no longer tolerable. The user interface can be bettered, for example, with fast response full screen applications.

Optimizing Communication Networks

There is a need for rationalizing the many disparate networks that major users have. Investments can be optimized by integrating heterogeneous traffics like voice, video, and data over the same transport facilities regardless of protocols. Users want the opportunity to control their networking cost by choosing among the different price/performance options offered by the variety of vendors and carriers and to maximize their ability to take advantage of applications built on top of disparate underlying network technologies. However, the motivation for rationalization this is not only to save money on links but also to provide a better networking service by integrating the many disparate networks into a single coherently managed unit.

Doing New Applications

Emerging applications like graphic, image, video, and multimedia processing are requiring a very large volume of traffic. These new applications that were not feasible (or indeed imaginable) before are now becoming accessible generating an ever-increasing demand on bandwidth.

High Speed Packet Switching Networks

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video, and traffic among channel attached hosts, business, engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architecture a set of requirements in term of performance and resource consumption which can be summarized as follows:

a very large flexibility to support a wide range of connectivity options, a very high throughput and a very short packet processing time, an efficient flow and congestion control.

Connectivity

In high speed networks, the nodes must provide a total connectivity. This includes attachment of the user's devices, regardless of vendor or protocol, and the ability to have the end user communicate with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

Throughput and Processing Time

One of the key requirement of high speed packet switching networks is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection and bandwidth management processes are managed by the access points of the network which reduces both the awareness and the function of the intermediate nodes.

Congestion and Flow Control

Communication networks have at their disposal limited resources to ensure an efficient packets transmission. An efficient bandwidth management is essential or take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth.

An ideal network should be able to transmit an useful traffic directly proportional to the traffic offered to the network and this as far as the maximum transmission capacity is reached. Beyond this limit, the network should operate at its maximum capacity whatever the demand is. In the reality, the operations diverge from the ideal for a certain number of reasons which are all related to the inefficient allocation of resources in overloaded environment.

For the operating to be satisfactory, the network must be implemented so as to avoid congestion. The simplest solution obviously consists in oversizing the equipments so as to be positioned in an operating zone which is distant from the congestion. This solution is generally not adopted for evident reasons of costs and it is necessary to apply a certain number of preventive measures among which the main ones are:

the flow control for regulating the emitting data rate of the calling subscriber at a rate compatible with what the receiver can absorb.

the load regulation for globally limiting the number of packets present in the network to avoid an overloading of the resources, and the load balancing for fairly distributing the traffic over all the links of the network to avoid a local congestion in particular resources.

Network Control

The flow and congestion control operations in the network generate additional traffic on the network. Ideally only the exact bandwidth needed at any time by a network connection should be dynamically reserved for that connection, and also only the exact bandwidth needed for the network control operations should be reserved for that purpose. However, it is essential for an efficient flow and congestion control to provide at any time enough network resources in terms of bandwidth or performance to the control traffic. The control traffic can be divided into two main families:

a network routing control traffic, and a network signalling control traffic.

Routing Control Traffic

The routing control traffic is used for distributing the network topology information between nodes of the network. This information is necessary mainly for the computation of routing paths between nodes in the network. Routing control messages are generally broadcasted to all nodes by means of Spanning Tree or Flooding mechanisms. Insufficient resources for routing control messages could lead to invalid network topology tables. It is obvious that a node, with an erroneous or obsolete view of the network topology, may take wrong routing decisions.

Signalling Control Traffic

The signalling control traffic is used to establish point-to-point and point-to-multipoint network connections across the network. Signalling control messages are generally forwarded towards the different nodes along the path of the connections. Insufficient resources for signalling control messages could typically lead to errors or at least to a degradation of the quality of service in the establishment and management of network connections.

Bandwidth Reservation for Control Traffic

Because of the high importance of the network control traffic, enough bandwidth on the links must be reserved to transmit the routing and signaling control messages. The fraction of the total link bandwidth specially reserved for the control traffic is called, in the present application, Control Traffic Reserved Fraction (CTRF). In most broadband network architectures known today a fixed percentage (typically CTRF=15%) of the links bandwidth is reserved for the control traffic:

irrespective of the link capacity and of the actual use.

without considering whether links belong to network Spanning Tree or not (Links on the Spanning Tree have to transmit all the routing control traffic, mainly Topology Update messages).

In a typical network, 230 kbps (15%×1.5 Mbps) are reserved on T1 links for the control traffic, while 6.8 Mbps (15%×45 Mbps) are reserved on T3 links and 23 Mbps (15%×155 Mbps) on OC3 links though all these links may have to support an equivalent amount of control traffic. The consequences are on one hand a waste of bandwidth on high speed links and on the other hand a potential shortage of reserved bandwidth on low speed links, with the risk of creating serious network problems. A fraction of the bandwidth on each of the links must be reserved to transmit the traffic required for network control operations. For efficiency and optimization reasons, this reserved fraction must be computed and dynamically updated according to both link and network characteristics. Only the minimum fraction of the link bandwidth actually necessary must be reserved, for allocating the maximum available bandwidth for the user traffic.

The object of the present application is to reserve dynamically and in priority for each link of the network the exact amount of bandwidth necessary for the transmission of the actual control traffic. An evaluation of the expected control traffic on every link of the network must be performed in order to allocate a sufficient fraction of the link bandwidth. The network control traffic comprises:

Signalling Messages

Connection setup and connection takedown messages,

Connections bandwidth refresh messages,

Connections bandwidth adaptation (increase/decrease) messages,

Directory queries in network (directed to a specific resource), . . .

Routing Messages

In addition to the traffic described above, links on the network Spanning Tree have to support.

Control Point Spanning Tree maintenance messages,

Topology Update messages,

Directory searches in network (broadcast through the network), . . .

For each link, the exact bandwidth value required to support the network control traffic, that means to offer a reasonable quality of service, is computed and dynamically maintained in the Topology Database within each node of the network

SUMMARY OF THE INVENTION

The present invention discloses a system and method, in a packet switching communication network comprising a plurality of nodes interconnected by transmission links, of reserving bandwidth on links for transmitting network control packets. This method comprises the steps of:

first, dynamically estimating, for each link, the bandwidth fraction necessary and sufficient for transmitting the network routing and signalling control packets on said link, and secondly, reserving said estimated bandwidth fraction on each link.

Said reserved bandwidth fraction increases with:

the number of connections on the link, the network routing control traffic for distributing topology information between nodes of the network, the number of links within the network for a transmission link belonging to a network control spanning tree.

The bandwidth fraction is independent of the number of links within the network for a transmission link not belonging to a network control spanning tree.

BRIEF DESCRIPTION OF THE DRAWINGS

FIG. 8 shows the bandwidth fraction necessary for transmitting control traffic on a T1 type link as a function of the number of network connections on the link:

when said link is on the network Spanning Tree, and when said link is not on the network Spanning Tree.

DESCRIPTION OF THE PREFERRED EMBODIMENT

High Speed Communications

Figure 2:
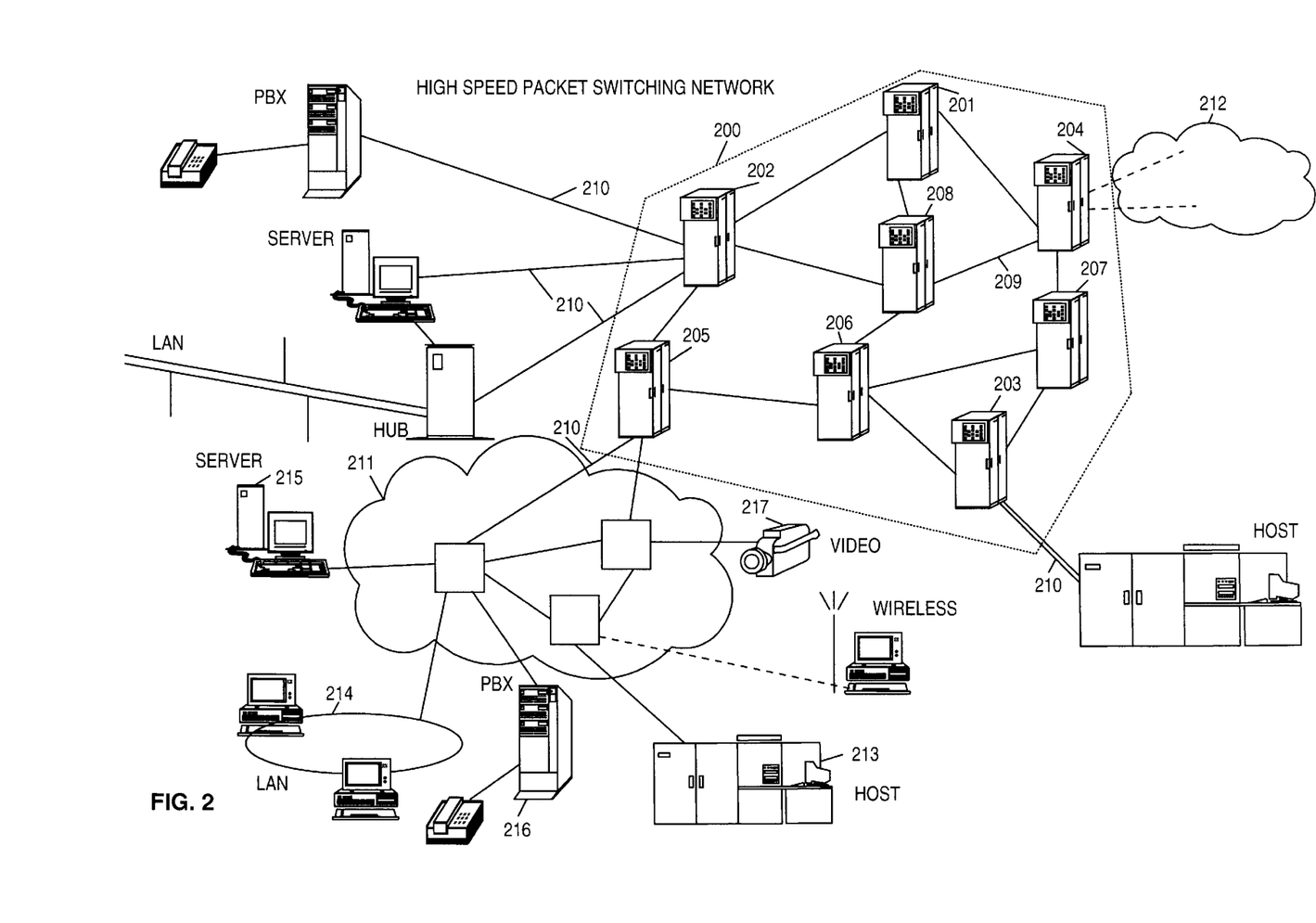
FIG. 2 shows a typical model of high speed packet switching network including the nodes claimed in the present invention.

As illustrated in FIG. 2, a typical model of a communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down transmission. Others are essentially looking for a high speed data transfer and to that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Performance Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Ports and communicates through the network by means of the adjacent Transit Nodes 201, 206 and 208.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for receiving digital data from another user system, or, typically, both. The interpretation of the users protocols, the translation of the users data into packets formatted appropriately for their transmission on the packet network (200) and the generation of a header to route these packets are executed by an Access Agent running in the Port. This header is made of Control and Routing Fields.

The Routing Fields contain all the information necessary to route the packet through the network (200) to the destination node to which it is addressed. These fields can take several formats depending on the routing mode specified (connection oriented or connectionless routing mode).

The Control Fields include, among other things, an encoded identification of the protocol to be used in interpreting the Routing Fields.

Routing Points

Figure 3:
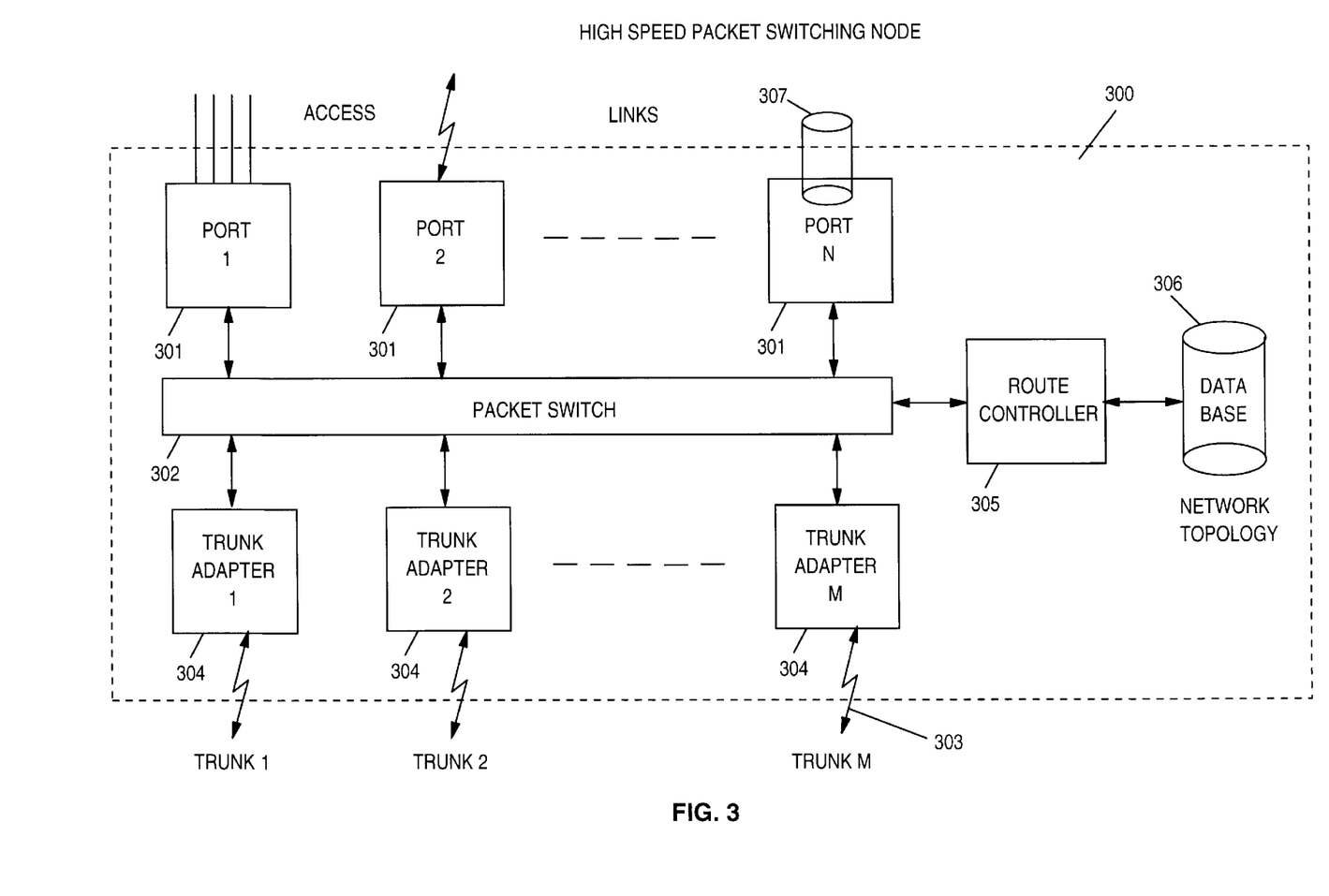
FIG. 3 describes a high speed Routing Point according to the present invention.

FIG. 3 shows a general block diagram of a typical Routing Point (300) such as can be found in the network nodes (201 to 208) illustrated in FIG. 2. A Routing Point comprises a high speed packet Switch (302) into which packets arriving at the Routing Point are entered. Such packets are received:

from other nodes over high speed transmission links (303) via Trunk Adapters (304).

from users via application adapters called Ports (301). Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality of service specified by the user and to minimize the amount of network resources used to complete the communication path. Then, it builds the header of the packets generated in the Routing Point. The optimization criterion includes the number of intermediate nodes, the characteristics of the connection request, the capabilities and the utilization of the Trunks in the path.

All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Path Servers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Network Control Functions

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular:

Directory Services
　for retrieving and maintaining information about network users and resources.

Bandwidth Management
　for processing the bandwidth reservation and maintenance messages, and
　for monitoring the current reservation levels on links.

Path Selection
　for choosing the best path for each new connection considering the connection requirements and the current link utilization levels.

a Control Spanning Tree
　for establishing and maintaining a routing tree among the network nodes,
　for using it to distribute control information (in parallel) including link utilization, and
　for updating the Topology Database of the nodes with new network configurations or link/node failures.

Topology Update
　for distributing and maintaining, in every node, information about the logical and physical network (including link utilization information) using the Spanning Tree.

Congestion Control
　for enforcing the bandwidth reservation agreements between the network's users and the network which are established at the call set up time, and
　for estimating actual bandwidth and for adjusting reservation if necessary during the life of the connection.

Network Spanning Tree

The main purpose of the network Spanning Tree is to ensure a communication and distribution mechanism for all network control functions in the nodes of a high speed network. It (logically joins together the Control Points (305) if the nodes are in a (physically) connected portion of the network. A tree is a pattern of connections with no loop, the term "spanning" means that the tree spans (connects) all of the nodes. Once formed, the Spanning Tree is the principal system used to disseminate control information such as Topology Database (306) updates. The mechanism is fundamental to minimize delays due to intermediate node processing.

First, an intermediate node will get each control message exactly once on the tree, and second, the message can be forwarded along outgoing links of the tree before the intermediate node has even looked at the packet contents.

A distributed algorithm creates and maintains the Spanning Tree in presence of node and link failure and help to minimize the impact of the increased control traffic that result when the network grows.

The Topology Update control messages allow, by means of the Spanning Tree, to distribute and maintain, in every node, information about the physical and logical network including the utilization of the links.

Topology Database (TDB)

The Topology Data Base contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilization which includes dynamic characteristics like current bandwidth (used and reserved), real time measurements . . .

To each resource in the network, nodes or links, is associated an entry in the database. In particular, each link entry includes the following characteristics:

link physical properties:
  transmission medium and speed,
  routing mode supported,
  maximum packet size,
  link buffer capacity,
  propagation delay,
  bandwidth reservation supported . . .
the link state:
  on-line (link can accept user connections),
  quiesce (link cannot accept additional user connections, but existing connections continue),
  off-line (link cannot accept user connections and existing connections are cancelled) . . .
link utilization:
  real time measurements,
  reserved bandwidth, . . .

Figure 1:
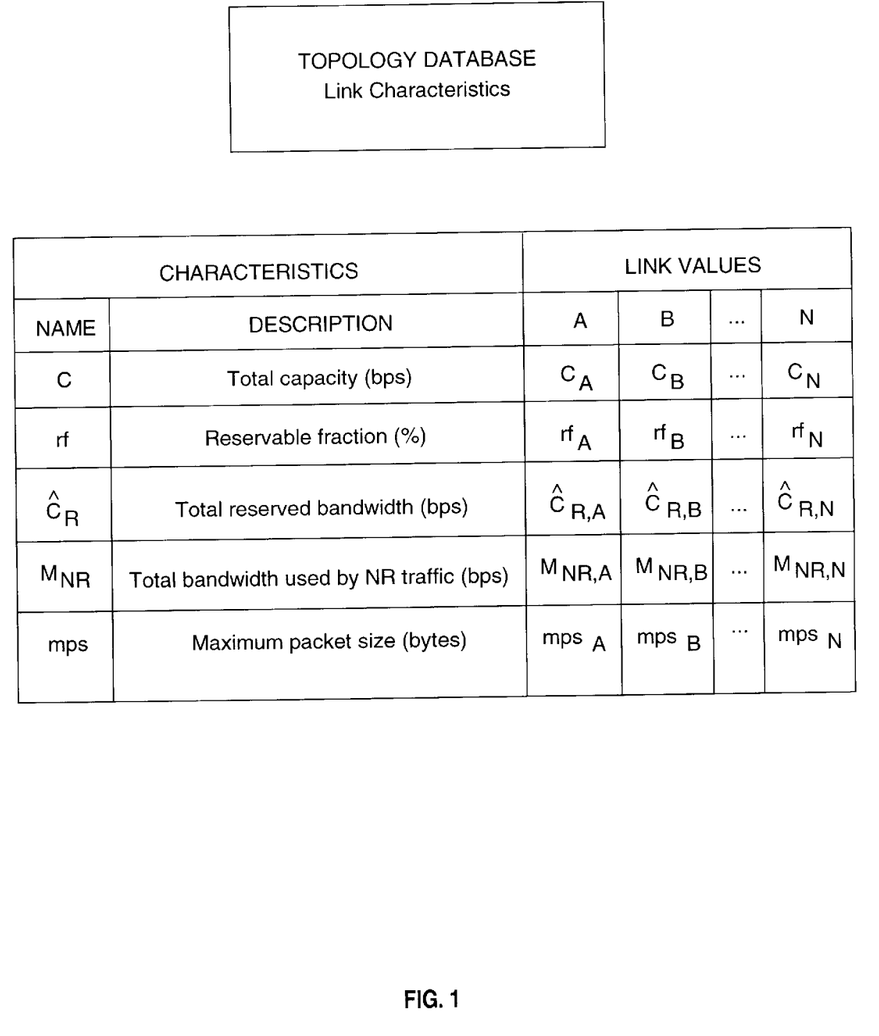
FIG. 1 shows a portion of the Topology Database in each Routing Point.

FIG. 1 shows in a table, some of the information stored in the Topology Database. Though all characteristics of the links are listed in each node, in the present application only a few will be described:

Total Capacity (bps) $C_{ij}$

The Topology Database contains, for each link, its Total Capacity. The value $C_{ij}$ represents the total bandwidth available on the link between nodes i and j.

Reservable Fraction (%) rf

As might be expected, one of the critical characteristics of transmission links is the fraction of the link capacity effectively available. Links cannot be loaded up to a theoretical maximum load (bandwidth) for two reasons:

first, to set aside bandwidth for network control functions, and secondly, to keep the loss probabilities and queueing delays low in the case of short term bandwidth violations by the different traffic sources.

The reservable fraction of a link rf is the effective percentage of the Total Capacity $C_{ij}$ that can be reserved on the link between nodes i and j to maintain a reasonable quality of transmission. If $C_{ij}$ is the Total Capacity of the link, then $R_{ij} = rf \times C_{ij}$ is the Reservable Capacity of this link ($\hat{C}_{ij} \leq R_{ij} \leq C_{ij}$).

NOTE: For most network architectures, no more than 85% of the total bandwidth of a link $C_{ij}$ can be explicitly reserved for user traffic (rf<0.85).

Total Reserved Equivalent Capacity (bps) $C_{R,ij}$

For a connection k on a link between node i and j, the simplest way to provide low/no packet loss would be to reserve the entire bandwidth requested by the user. However, for bursty user traffic, this approach can waste a significant amount of bandwidth across the network. To save resources, the bandwidth amount actually reserved is equal to an "Equivalent Capacity" $\hat{C}_{k,ij}$ said Equivalent Capacity being a function of the source characteristics and of the network status. The bandwidth reservation falls somewhere between the average bandwidth required by the user and the maximum capacity of the connection.

The value $$\hat{C}_{R,ij} = \hat{C}_{R,ij}^K = \sum_{k=1}^{K} \hat{C}_{k,ij} =$$

sum of the reserved Equivalent Capacities represents the total bandwidth reserved on the link between nodes i and j by K connections already established. If the difference between this already reserved link Equivalent Capacity $\hat{C}_{R,ij}$ and the Total Reservable Capacity of the link $rf \times C_{ij}$ is less than the bandwidth requested by a new reserved connection then the link cannot be selected. However, the link may be selected for a non-reserved connection where no explicit bandwidth reservation is needed.

Total Bandwidth used by Non-Reserved Traffic (bps) $M_{NR,ij}$

The value $M_{NR,ij}$ represents the total load or bandwidth currently used by non-reserved traffic as measured on the link between nodes i and j.

Maximum Link Packet Size (bytes) $mps_{ij}$ $mps_{ij}$ is defined as the maximum packet size supported by the link between nodes i and j.

Bandwidth Reservation

Most of the high speed connections are established on a reserved path to guarantee the bandwidth and the quality of service requested by the user. The path across the network is computed in response to each connection request by the originating node. The computed path is based on the parameters characterizing the network connection's requirements and on link capacity and load information maintained in the Topology Database of each network node. The originating node sends a reservation request to the end node. As the bandwidth request packet flows along the chosen path, each transit node determines whether it has enough capacity to accept the new connection. If the connection is accepted, the requested bandwidth is reserved. Changes are reflected in every node of the network by means of Topology Update control messages.

Network Connection Table (NCT)

Figure 4:
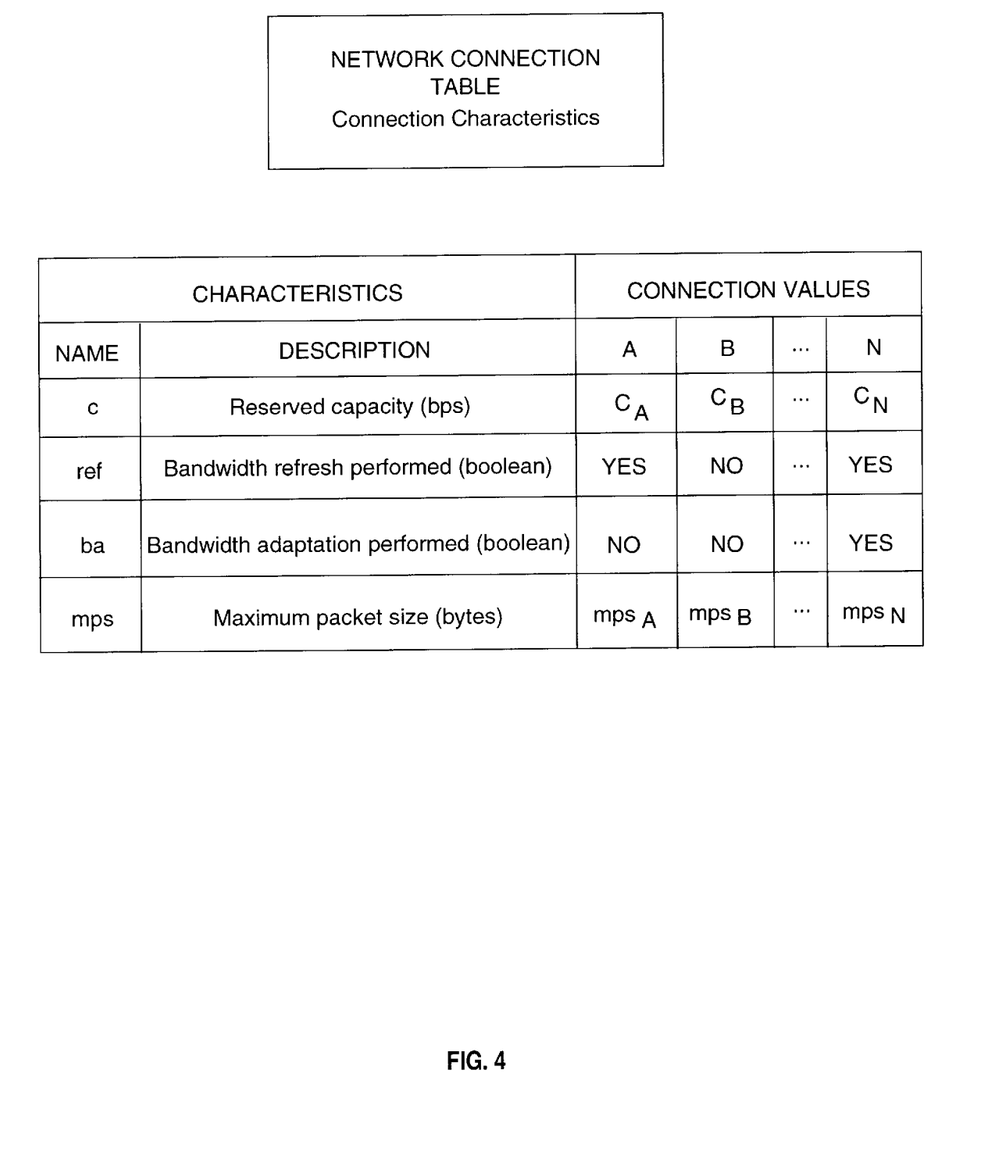
FIG. 4 shows a portion of the Network Connection Table in each Routing Point.

FIG. 4 shows, in tabular form, a portion of the information stored in the Network Connection Table (NCT) of each node of the network. The different attributes of each connection with reserved bandwidth, are listed in this table. Though all the characteristics of the connections are listed in each node, in the present application only a few will be described:

Reserved Capacity (bps) c $c_i$ corresponds to the bandwidth actually reserved by the connection i.

Bandwidth Refresh (Boolean) ref

It is a Boolean indicating if the connection is refreshed or not. To ensure that bandwidth is kept reserved for active network connections, connection refresh messages are periodically sent along the path by the originating node. If nodes along the path do not receive any of these connection refresh messages within their own timer period, then they assume that the originating node or a transit node along the physical path of the connection has failed.

Bandwidth Adjustment (Boolean) ba

The Bandwidth Adjustment is the ability to dynamically change the level of bandwidth reservation of a network connection while keeping the network connection active. The Bandwidth Adjustment parameter is a Boolean indicating if this function is activated or not.

Maximum Connection Packet Size (bytes) $mps_k$ $mps_k$ is defined as the maximum packet size of the connection k, must be less than Maximum Link Packet Size.

Dynamic Bandwidth Reservation for Control Traffic

The fraction of the link bandwidth which is dynamically reserved to flow the control traffic of the network, is called, in the present application, dynamic Control Traffic Reserved Fraction (dCTRF).

The dCTRF is a percentage computed by assessing the different control traffic contributors.

At the link level, these contributors are, for example:

the nominal number of connections set-up/takedown performed per second, the number of connections on the link with bandwidth refreshment, the number of connections with 'bandwidth adjustment' parameter enabled, At the network level for links belonging to the Spanning Tree, the control traffic contributors are, for example: the network size (number of network nodes, access nodes, the number of links).

These contributors are stored in the Network Connection Table and in the Topology Database in every node.

Fixed Bandwidth Reservation

Figure 5:
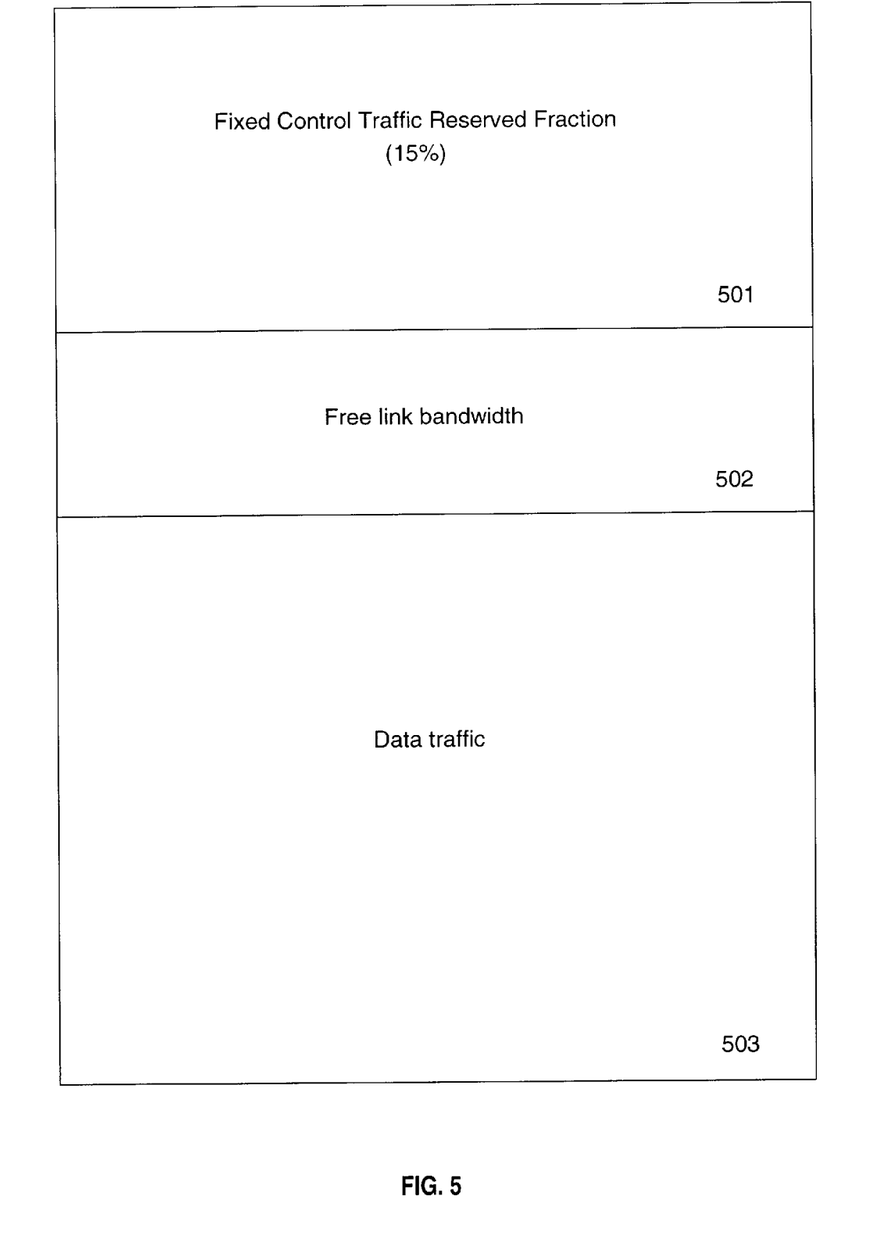
FIG. 5 shows an example of bandwidth utilization when a fixed fraction of the link bandwidth is reserved for network control traffic.

FIG. 5 shows an example of bandwidth distribution within a link when a fixed Control Traffic Reserved Fraction (CTRF) is used. The bandwidth is divided in three parts:

A fixed part (501) reserved to the Control Traffic (typically 15% of the total bandwidth).

A second part (503) corresponding to the link bandwidth used for data traffic (this part is variable).

A third part (502) corresponding to the link bandwidth which remains available (this part is variable).

Dynamic Bandwidth Reservation

Figure 6:
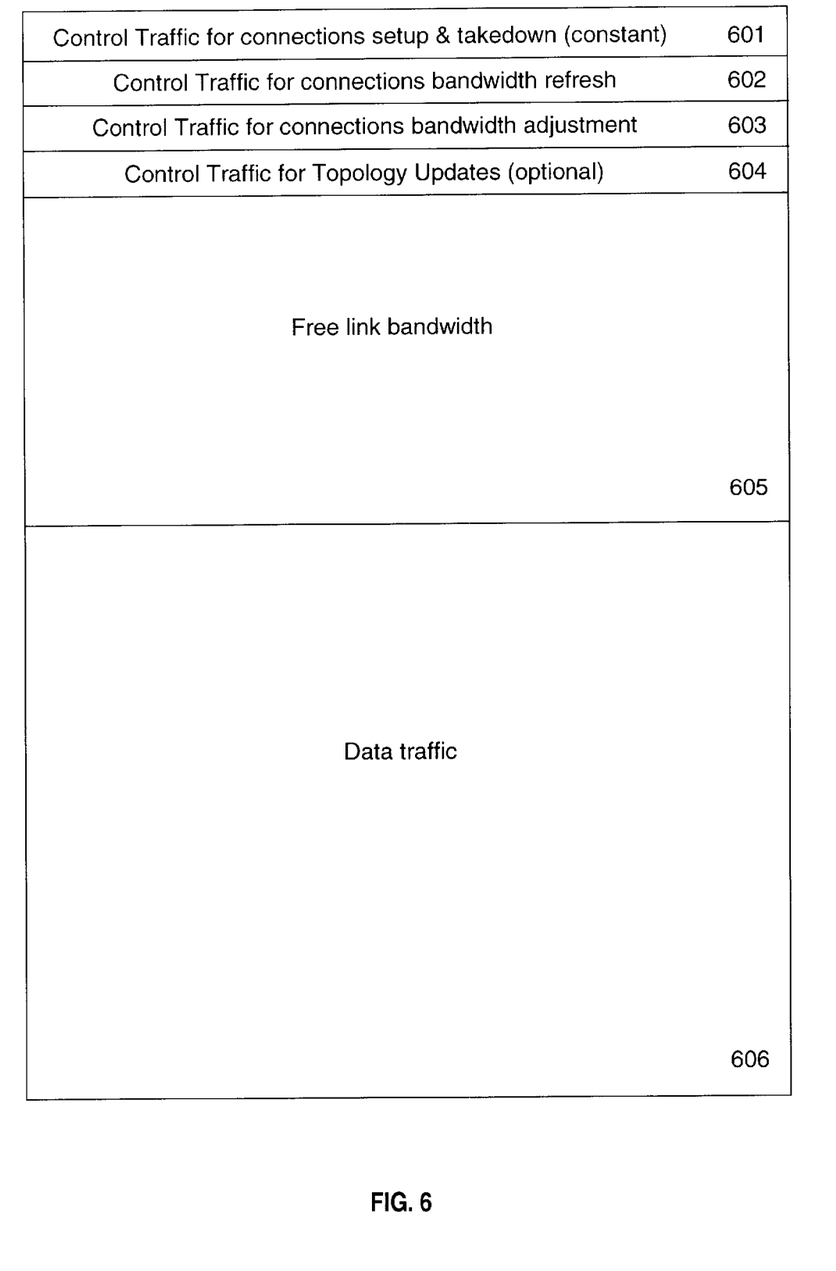
FIG. 6 shows an example of bandwidth utilization when the fraction of bandwidth reserved for network control traffic is allocated dynamically.

FIG. 6 shows an example of bandwidth distribution within a link when a dynamic Control Traffic Reserved Fraction (dCTRF) is used. The bandwidth is divided in six parts:

A fixed part $B_{cst}$ (601) reserved to the Control Traffic generated by connections setup and takedown.

A second part $B_r$ (602) reserved to the Control Traffic generated by connections bandwidth refresh.

A third part $B_{ba}$ (603) reserved to the Control Traffic generated by connections bandwidth adjustment.

A fourth part $B_{tu}$ (604) reserved to the Control Traffic generated by topology updates (it is in fact the product of the total number of links in the network by the bandwidth needed to transmit a Topology Update message)

NOTE: the reservation is effective only if the link belongs the Spanning Tree.

A fifth part corresponding to the link bandwidth used for data traffic (606). This part is variable.

A last part corresponding to the link bandwidth which remains available (605). This part is variable.

dCTRF Computation

From these considerations, the Bandwidth Management function is able to compute a therotic dCTRF, and thus to reserve, with a certain percentage of contingency, the amount of bandwidth necessary to flow the network control traffic on each link. The Topology Database Update messages, periodically broadcasted in the network, inform the nodes of the the bandwidth fraction which can be reserved on each link for data traffic (rf=1−dCTRF). This allows:

to keep updated values, in the Topology Database of each node, of the actual reservable bandwidth fraction rf of each link within the network.

to route the user data traffic on links up to (1−dCTRF) % (instead of 85%) of the total bandwidth.

The dCTRF may be computed according to the following expression which is given as example:

$$dCTRF = \frac{(F_{cst} \times CM_{cst}) + (N_{ref} \times CT_{ref}) + (N_{ba} \times CT_{ba}) + (ST \times L \times CT_{tu})}{C}$$

where:

$F_{cst}$ is the average number of connections setup or takedown per second on the link.

$N_{ref}$ is the number of connections with bandwidth refreshed.

$N_{ba}$ is the number of connections with bandwidth adjustment.

$CM_{cst}$ is the average size of control messages in bits needed to perform a connection setup or takedown on the link.

$CT_{ref}$ is the capacity in bps needed to refresh a connection on the link (assuming an average refresh period of 1 mn).

$CT_{ba}$ is the capacity in bps needed to perform bandwidth adjustment for a connection on the link (assuming an average adjustment period of 10 s).

ST is 1 if the link belongs to the network Spanning Tree, otherwise 0.

L is the total number of links in the network.

$CT_{tu}$ is the capacity in bps used by the Topology Database Update messages on the link (assuming an average Topology Database message period of 1 mn).

C is the total capacity of the link in bps.

Path Selection

The purpose of the Path Selection function is to determine the best way to allocate network resources to connections both to guarantee that user quality of service requirements are satisfied and also to optimize the overall throughput of the network. The Path Selection function must supply to the requesting user a path over which a point-to-point connection will be established, and some bandwidth will be reserved if needed. The Path selection algorithm uses as input parameters on one side the user requirements and on the other side the status of the network links and nodes as maintained in the Topology Database.

When analyzing the links to search a path, the Path Selection function adds to the user bandwidth requested by the connection (connection equivalent capacity) the δ amount of bandwidth needed to control that connection. This amount of marginal bandwidth is considered by the Bandwidth Management as reserved bandwidth for control traffic once the connection has been established on the link. The marginal fixed amount of bandwidth used by the Path Selection is composed of $\delta B_{ref}$ if the connection is refreshed and $\delta B_{ba}$ if the connection is bandwidth adjusted. A link is selected only if enough free bandwidth is available for connection data and control bandwidth requirements. Once the connection has been successfully established on the link, the bandwidth reservation is updated as follows:

$\delta B_{ref}$ is added to the link total control traffic for all connections bandwidth refresh (602), $\delta B_{ba}$ is added to the link total control traffic for all connections bandwidth adjustment (603).

Control Traffic Monitoring

In addition, the Bandwidth Management function receives periodically from its link adapter hardware the actual average value of the control traffic on the link (in bps), and thus may compare with its assessment and eventually modify the percentage of contingency taken into account. This mechanism provides to the Bandwidth Management the capability to detect an excessive network control traffic on the link and may refer this information to its Topology and Spanning Tree Manager. A link may be removed from the network Spanning Tree if its dCTRF is too high. The network Spanning Tree is then reorganized to exclude that link.

Examples of Implementation

Figure 7:
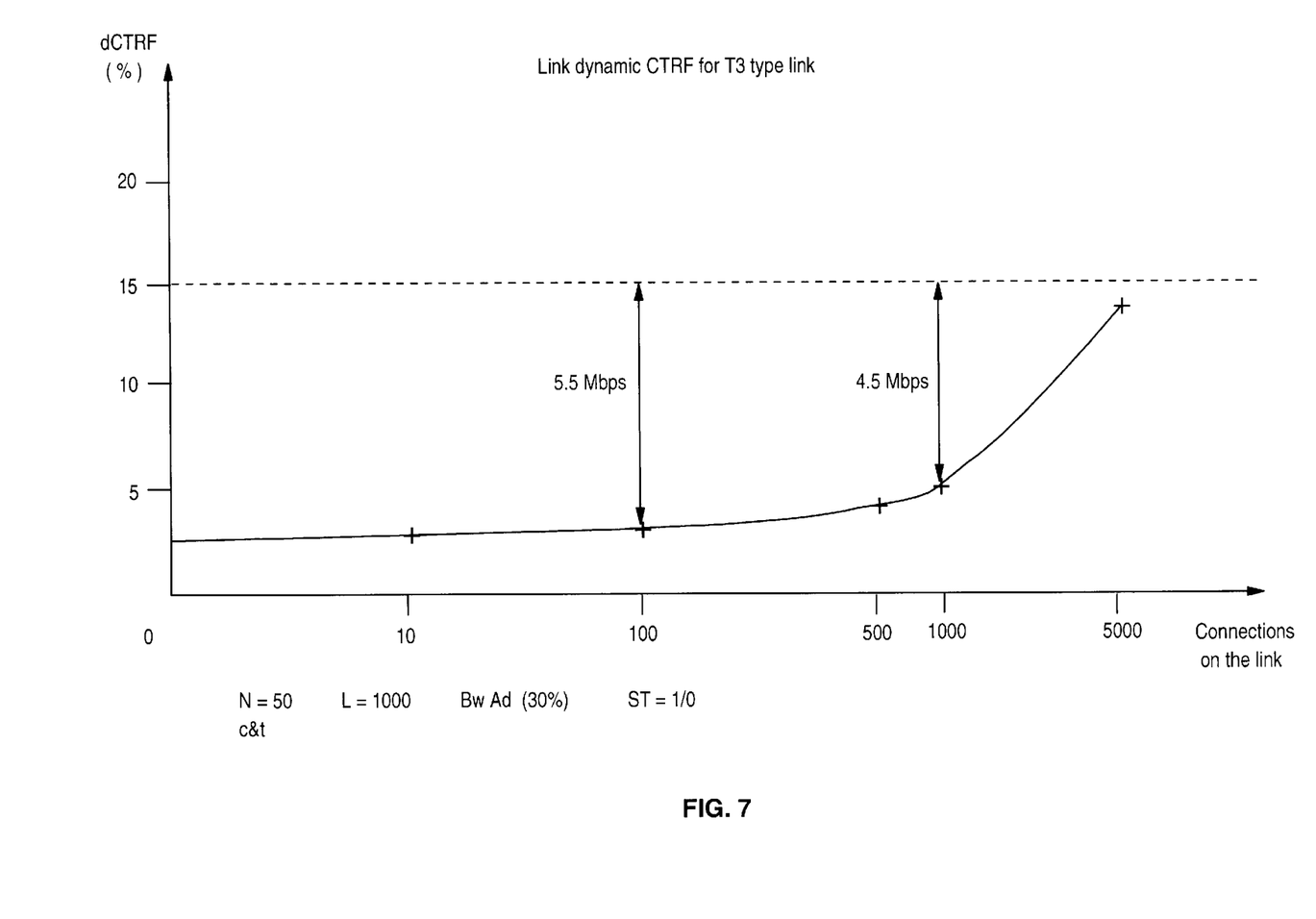
FIG. 7 shows the bandwidth fraction necessary for transmitting the control traffic on a T3 type link in function of the number of network connections on the link.
Figure 8:
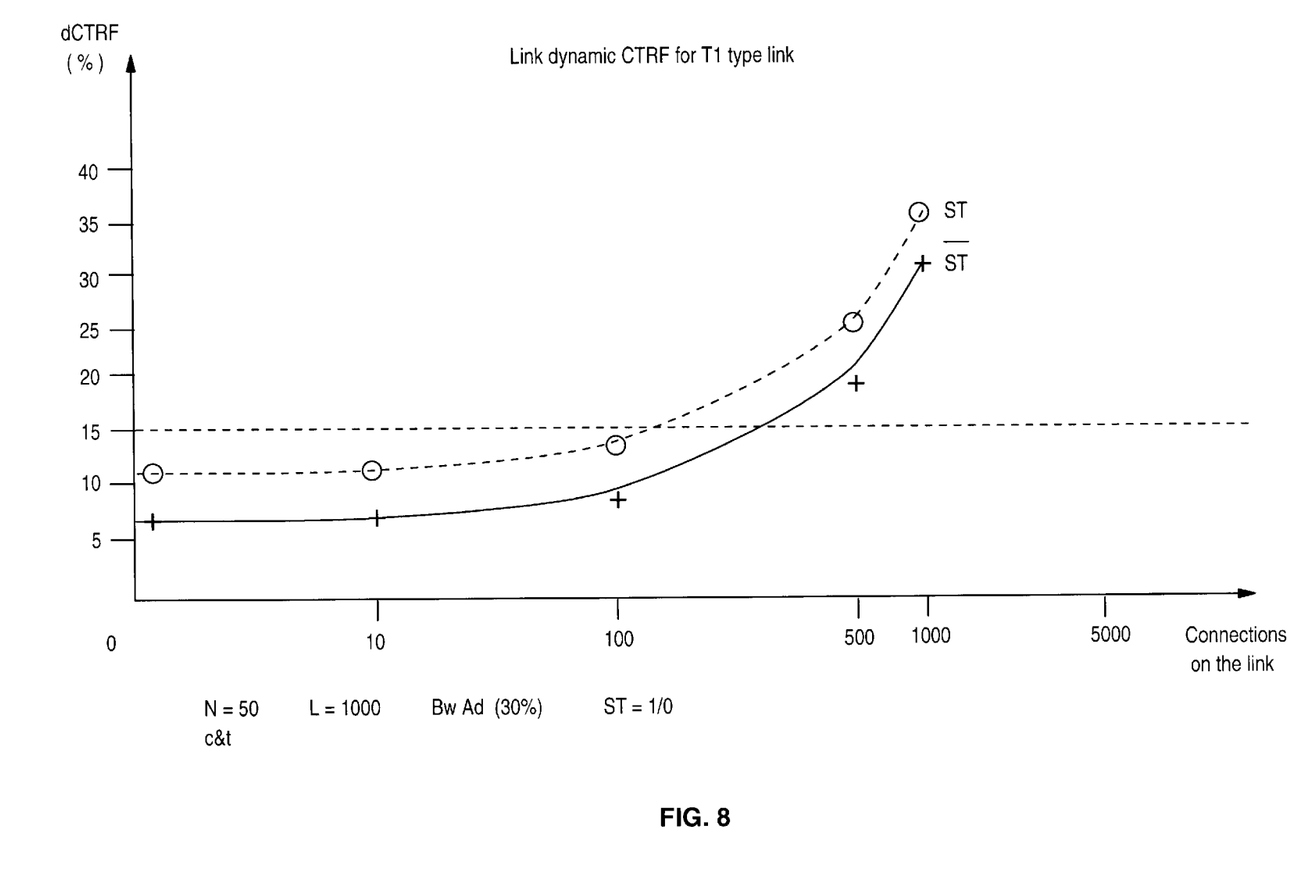
Figure 9:
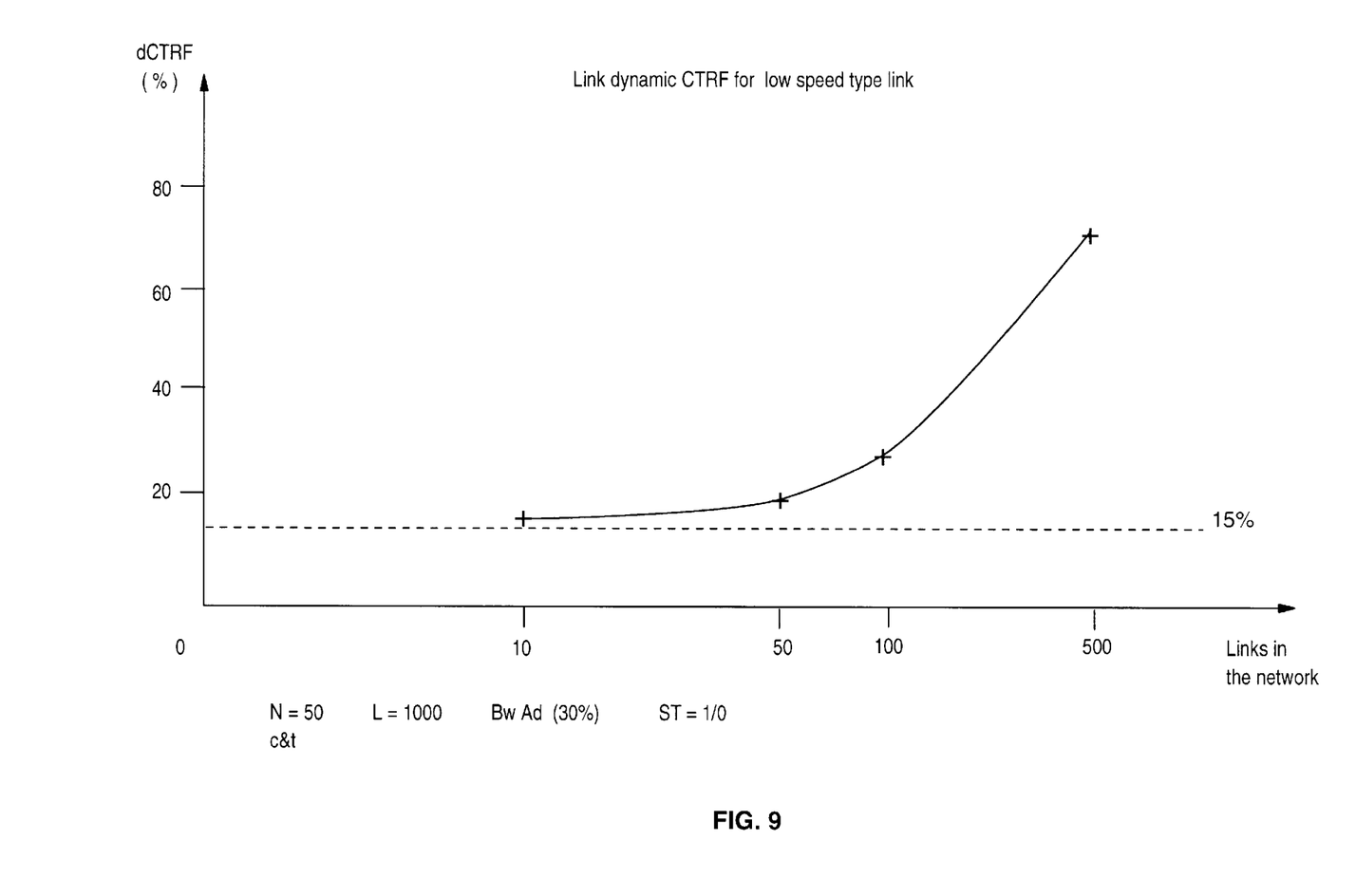
FIG. 9 shows the bandwidth fraction necessary for transmitting control traffic on a low speed type (64 kbps) link on the network Spanning Tree as a function of the number of links in the network.

NOTE: the numerical values used in the examples illustrated in FIGS. 7, 8 and 9 are described in Appendix B.

DCTRF Example for T3 Link (44.736 Mbps)

FIG. 7 shows the bandwidth saving generated by the Link dynamic CTRF approach for a T3 link:

- Up to 1000 connections on the link, the bandwidth saving is really important (more than 4.5 Mbps saved) compared with the fixed 15% CTRF approach.
- Beyond 1000 connections on the link, the link dynamic CTRF rapidly raises and the bandwidth saving decreases and becomes null for 5000 connections.
- Beyond 5000 connections on the link, the link dynamic CTRF continues to perfectly fit the actual need of bandwidth for Control Traffic. On the other hand the fixed 15% CTRF over reserves the bandwidth for data traffic to the detriment of the control traffic (which can be dangerous for the network operations).

DCTRF Example for T1 Link (1.544 Mbps)

FIG. 8 shows the bandwidth saving provided by the Link Dynamic CTRF approach for a T1 link belonging or not to the Spanning Tree.

- When the link does not belong to the Spanning Tree and when the number of connections remains low (<100 connections), the bandwidth saving is important (about 50% compared with the fixed 15% CTRF approach).
- When the link belongs to the Spanning Tree, the control traffic is more important and the bandwidth saving is smaller (between 30% for 10 connections and 10% for 100 connections).
- Beyond 100 connections on the link, the link dynamic CTRF continues to perfectly fit the actual need of bandwidth for Control Traffic in the two cases (link belonging or not to the Spanning Tree). On the other hand the fixed 15% CTRF over reserves the bandwidth for data traffic by minimizing very early the amount of control traffic required (beyond 100 connections—link on Spanning Tree—and beyond 300 connections—link out of the Spanning Tree—).
- The difference between the two curves proves that control traffic is significantly more important when the link is located on the spanning tree. The consideration of this parameter allows to optimize the bandwidth allocation for links which are not on the Spanning Tree.

DCTRF Example for 64 kbps Link

FIG. 9 shows an inadequate bandwidth reservation for control traffic when using the fixed 15% CTRF approach. This phenomenons is amplified when the link is on the spanning tree. Whatever the network size, for 10 connections on the link, the reserved part for control traffic is too small. On the other hand, the link dynamic CTRF always reserves for control traffic a bandwidth corresponding to the actual need (function of the number of links in the network). Furthermore, FIG. 9 shows that this type of link (64 kbps) is not suited for belonging to the network Spanning Tree. A major part of the link capacity is dedicated to the Spanning Tree control Traffic and not to the transmission of users data.

APPENDIX dCTRF example for T3 type link
dCTRF computation for a T3 type link $F_{CST} = 50, C = 45$ Mbps, $L = 1000$, Bandwidth Adjustment active

| $C_x$ | $B_{cst}$ | $B_{ref}$ | $B_{ba}$ | $B_{ru}$ | dCTRF (%) |
|---|---|---|---|---|---|
| 10 | 1 | 0 | 0.01 | 0.07 | 2.4 |
| 100 | 1 | 0.007 | 0.1 | 0.07 | 2.6 |
| 500 | 1 | 0.035 | 0.5 | 0.07 | 3.6 |
| 1000 | 1 | 0.07 | 1 | 0.07 | 4.8 |
| 5000 | 1 | 0.35 | 5 | 0.07 | 14 | dCTRF example for T1 type link
Link not on spanning tree
dCTRF computation for a T1 type link or non spanning tree $F_{CST} = 5, C = 1.5$ Mbps, $L = 1000$, Bandwidth Adjustment active on 30% of the connections

| $C_x$ | $B_{cst}$ | $B_{ref}$ | $B_{ba}$ | $B_{ru}$ | dCTRF (%) |
|---|---|---|---|---|---|
| 1 | 0.1 | 0 | 0 | 0 | 6.5 |
| 10 | 0.1 | 0 | 0.003 | 0 | 6.7 |
| 100 | 0.1 | 0.007 | 0.03 | 0 | 8.9 |
| 500 | 0.1 | 0.035 | 0.15 | 0 | 18.5 |
| 1000 | 0.1 | 0.07 | 0.3 | 0 | 30.5 |

Link on spanning tree
dCTRF computation for a T1 type link on spanning tree $F_{CST} = 5, C = 1.5$ Mbps, $L = 1000$, Bandwidth Adjustment active on 30% of the connections

| $C_x$ | $B_{cst}$ | $B_{ref}$ | $B_{ba}$ | $B_{ru}$ | dCTRF (%) |
|---|---|---|---|---|---|
| 1 | 0.1 | 0 | 0 | 0.07 | 11 |
| 10 | 0.1 | 0 | 0.003 | 0.07 | 11.2 |
| 100 | 0.1 | 0.007 | 0.03 | 0.07 | 13.4 |
| 500 | 0.1 | 0.035 | 0.15 | 0.07 | 23 |
| 1000 | 0.1 | 0.07 | 0.3 | 0.07 | 35 | dTRCF examples for low speed 64Kbps type link
dCTRF computation for a 64Kbps type link $F_{CST} = 0.5, C_x = 10$, $C = 64$ kbps, no Bandwidth Adjustment on the connections, link is on the spanninig tree

| L | $B_{cst}$ | $B_{ref}$ | $B_{ba}$ | $B_{ru}$ | dCTRF (%) |
|---|---|---|---|---|---|
| 10 | 10 | 0.7 | 0 | 0.7 | 17.8 |
| 50 | 10 | 0.7 | 0 | 3.5 | 22.2 |
| 100 | 10 | 0.7 | 0 | 7 | 27.7 |
| 500 | 10 | 0.7 | 0 | 35 | 71.4 |
| 1000 | 10 | 0.7 | 0 | 70 | — |

Note:
All bit rates are in Mbps

We claim:

1. In a packet switching network, a method for reserving a fraction of the bandwidth on a link for the transmission of network control packets comprising the steps:

calculating a network bandwidth fraction ft=(Fcst.CMcst)+(Nref.CTref)+(Nba.CTba)+(ST.L.CTtu)/C where:
Fcst is the average number of connections setup or taken down per second on a link,
CMcst is the average size in bits required to setup or take down a connection on a link,
Nref is the number of connections with bandwidth refreshed,
CTref is the capacity in bits per second required to refresh a connection on a link having a predetermined refresh period,
Nba is the number of connections with bandwidth adjustment, CTba is the capacity in bits per second required to perform bandwidth adjustment for a connection on a link having a predetermined adjustment period, ST is equal to 1 for a link in the network spanning tree and 0 for all other links, L is the total number of links in the network, CTtu is the capacity in bits per second required by the topology database update messages on a link having a predetermined average topology database message period, and C is the link capacity in bits per second, for determining the bandwidth required; to setup and take down connections on a link, to refresh connections on a link, to adjust the bandwidth of connections on a link and for transmission of topology database messages on a link; and reserving the calculated bandwidth for the transmission of network control packets.

2. The method set forth in 1 including the following step:
recalculating the network bandwidth fraction at predetermined times.

3. The method set forth in 1 including the following step:
recalculating the network bandwidth fraction each time that a connection is changed.

* * * * *